J. R. WATSON.
CONTROL FOR ELEVATOR MECHANISM AND THE LIKE.
APPLICATION FILED AUG. 26, 1912.
1,158,344.
Patented Oct. 26, 1915.
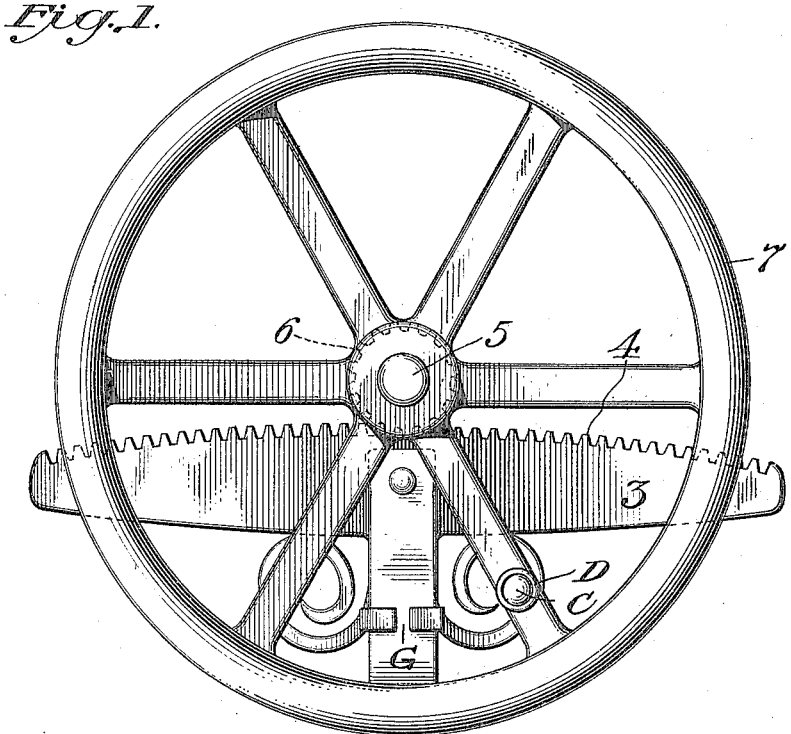
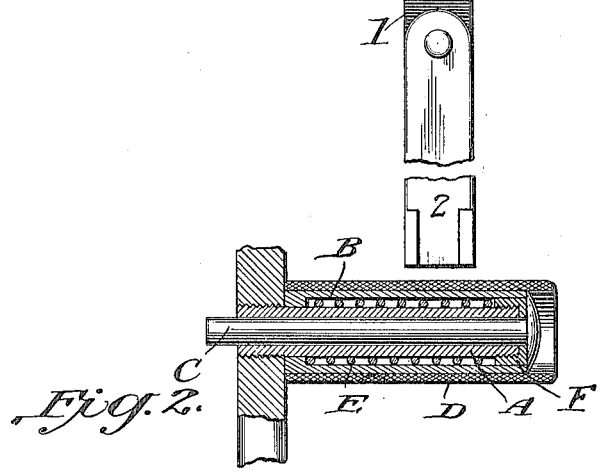
Witnesses:
Charles F. Allen
William R. Gnelck.
Inventor:
Joseph R. Watson

UNITED STATES PATENT OFFICE.

JOSEPH RICHARD WATSON, OF LOS ANGELES, CALIFORNIA.

CONTROL FOR ELEVATOR MECHANISM AND THE LIKE.

1,158,344.

Specification of Letters Patent.

Patented Oct. 26, 1915.

Application filed August 26, 1912. Serial No. 717,221.

*To all whom it may concern:*

Be it known that I, JOSEPH RICHARD WATSON, a citizen of the United States, residing at Los Angeles, in the county of Los Angeles and State of California, have invented a new and useful Control for Elevator Mechanism and the like, of which the following is a specification.

This invention is to be used in connection with the controlling lever and where so used is intended to prevent the abrupt and jerky starts and stops of the car so disagreeable to passengers and so wearing on the machinery, valves, cables, etc.

The accompanying drawings illustrate the invention:

Figure 1 is an elevation embodying the invention and viewed from the operating side. Fig. 2 is an enlarged sectional detail of the latch handle in Fig. 1.

An operating wheel 7 is provided having a latching handle constructed, for example as follows: A hollow shaft A is screw threaded into one of the spokes of the wheel 7 and is surrounded by a spring case B between which and the shaft there is sufficient space to accommodate a coil spring E, said spring bearing at one end against the spring case and bearing at its other end against a shoulder formed by a cap F that is screw threaded onto the end of the shaft, so that the power of said spring is exerted to force the spring case toward the wheel.

The hollow shaft A is provided with a headed latch bolt C having a body extending through the cap F and through the hollow shaft and projecting rearward beyond the wheel 7, the head of said bolt resting upon the spring case B, so that forcing the spring case outward will also force the latch bolt outward to retract its inner end into the hollow shaft A. The spring case B is provided with a suitable grip D of leather or the like to afford a suitable hold for the hand of the operator. The latch bolt C is thus designed to be operated to cause it to engage and disengage a slot G provided on the lever 1 which will be described hereinafter.

It will be noticed that the spring is held in place by the collar on A, and B is thus constantly forced to the wheel, so when the cover D is secured to B the catch bolt C is pressed inward and being long enough to pass through and project inside the wheel makes a spring catch to fit into the slot E, Fig. 1, and locks the wheel on center. This bolt, being secured at its head by B and D, is released from the slot by a pull of the hand and the lever is again free.

The controlling lever 1 is mounted in the usual way of such levers, being provided with a seat 2 to fit over a stub lever, not shown, for controlling the elevator mechanism. Said lever 1 is provided with a rack 3 which extends on both sides of the lever 1 and has its teeth 4 arranged in an arc inscribed from the axis, not shown, on which the lever 1 oscillates. Adjacent the teeth 4 there is provided a fixed axis 5 on which is journaled a pinion 6 that meshes with the teeth 4 of the rack 3 and is controlled by the wheel 7 to which the pinion 6 is fixed, said wheel being provided with the anti-friction handle above described by which it may be revolved in either direction, thus oscillating the rack 3, first in one and then in the other direction depending on the direction of the revolution of the wheel.

In practical operation the operator sitting or standing in the car will grasp and move the handle at D to turn the wheel, and consequently the pinion, in one and the other direction as required. Motion is thus applied to the rack 3 which is swung, first in one and then in the other direction, always coming to rest for the purpose of holding the elevator mechanism inactive when the lever 1 is vertically below the pinion. The rack stands equidistant on opposite sides of the lever 1 and when the wheel is rotated in one direction the rack is forced to the right or the left as the case may be, thus appropriately shifting the lever 1 to operate the hydraulic mechanism to raise or lower the elevator. When the elevator has gone nearly the required distance the crank handle will be turned in the other direction and the pinion made to operate the rack until the lever 1 is again vertical to the axis 5, thus again bringing the elevator to a stop.

I claim—

The combination with a lever having a slot, of a rack fixed to the lever, an axle, a pinion mounted on the axle and meshing with the rack, a wheel mounted to turn the axle, and a handle to turn the wheel, said handle having a latch bolt designed to engage the slot to hold the wheel and lever against relative movement.

JOSEPH RICHARD WATSON.

Witnesses:
C. F. ALLEN,
WILLIAM R. GRELCK.

Copies of this patent may be obtained for five cents each, by addressing the "Commissioner of Patents, Washington, D. C."